United States Patent [19]

Kumagai

[11] Patent Number: 5,450,291
[45] Date of Patent: Sep. 12, 1995

[54] LIGHTING SYSTEM FOR CAMERA

[75] Inventor: Ryohei Kumagai, Tokyo, Japan

[73] Assignee: Ezel Inc., Tokyo, Japan

[21] Appl. No.: 997,124

[22] Filed: Dec. 24, 1992

Related U.S. Application Data

[63] Continuation of Ser. No. 646,398, Jan. 28, 1991, abandoned.

[30] Foreign Application Priority Data

Jan. 29, 1990 [JP]  Japan ................................. 2-18662

[51] Int. Cl.⁶ ...................... G03B 15/06; F21V 8/00
[52] U.S. Cl. .......................................... 362/3; 362/11;
362/32; 362/293; 356/237
[58] Field of Search ................ 362/3, 8, 11, 32, 234,
362/240, 294; 354/81, 132; 358/457, 487;
356/237, 416

[56] References Cited

U.S. PATENT DOCUMENTS

| | | | |
|---|---|---|---|
| 2,322,032 | 6/1943 | Kunze | 362/234 |
| 2,431,825 | 12/1947 | Pollock | 354/81 |
| 2,612,824 | 10/1952 | Kroemmelbein, Jr. | 354/81 |
| 2,747,459 | 5/1956 | Morrison | 362/250 |
| 3,635,135 | 1/1972 | Ambraschka | 362/32 |
| 3,696,720 | 10/1972 | Vinson | 355/20 |
| 3,834,812 | 9/1974 | Adamson et al. | 354/81 |
| 3,918,810 | 11/1975 | Cohen | 354/81 |
| 4,028,728 | 6/1977 | Sharp | 356/237 |
| 4,423,470 | 12/1983 | Naito et al. | 354/132 |
| 4,627,008 | 12/1986 | Rosenthal | 356/416 |
| 4,677,473 | 6/1987 | Okamoto et al. | 362/32 |
| 4,688,939 | 8/1987 | Ray | 356/237 |
| 4,695,157 | 9/1987 | Schoenbaum et al. | 356/237 |
| 4,974,094 | 11/1990 | Morito | 362/32 |
| 5,005,975 | 4/1991 | Kawai et al. | 356/237 |
| 5,051,872 | 9/1991 | Anderson | 362/32 |
| 5,077,640 | 12/1991 | Butler, Jr. | 362/11 |

FOREIGN PATENT DOCUMENTS

| | | | |
|---|---|---|---|
| 0004187 | 2/1914 | Austria | 362/11 |
| 122905 | 9/1981 | Japan | 356/237 |
| 0118829 | 6/1985 | Japan | 362/3 |
| 133008 | 6/1988 | Japan | 356/237 |
| 142239 | 6/1988 | Japan | 356/237 |
| 1476358 | 4/1989 | Japan | 356/237 |
| 197637 | 8/1989 | Japan | 356/237 |

OTHER PUBLICATIONS

Nishimori et al., "Online Automatic Seal–Impression Comparing System", Oki Review, vol. 52, No. 3, pp. 61–66 1985.

*Primary Examiner*—Ira S. Lazarus
*Assistant Examiner*—Y. Quach
*Attorney, Agent, or Firm*—Cushman, Darby & Cushman

[57] ABSTRACT

A lighting system for camera comprising light irradiation means which possesses plural luminous objects arranged circularly concentric to a camera lens, and cylindrical shield parts to restrain light from outside arranged between the camera and an object to be photographed.

10 Claims, 6 Drawing Sheets

LIGHTING SYSTEM FOR CAMERA

This is a continuation of application Ser. No. 07/646,398, filed on Jan. 28, 1991, which was abandoned upon the filing hereof.

FIELD OF THE INVENTION

The present invention relates to a lighting system, irradiates light to the object to be photographed.

BACKGROUND OF THE INVENTION

Conventionally, an irradiation system is settled near a camera to take a photograph of a shape by CCD camera in the case of using shape (seal-imprint) verification to judge if a sealed imprint is the same as registered one. This irradiation system possesses plural light-supplying lamp to irradiate light from upper slanting direction of an imprint as disclosed, for example in the publication No. Sho 59-49666. The light irradiated from such a light-supplying lamp does not reflect the vermilion imprint substantially but reflects white paper. The imprint is taken a photograph by CCD camera and performed the processing for imprint verification after inputted to the computer of imprint verification system.

SUMMARY OF THE INVENTION

As seal-imprint is not the same along the way of imprinting, it has to be photographed as accurate as possible. Accordingly, the light for imprints must be even for whole imprint.

Considering such a problem, the present invention has an object to provide a lighting system for irradiating even light to whole imprint and photographing the imprint more accurately.

The lighting system according to the present invention has the characteristics of comprising a lighting system for camera characterized in comprising light irradiation means which possesses plural luminous objects arranged circularly in the center of camera lens, and cylindrical shield parts to restrain light from outside arranged between the camera and an object to be photographed.

PREFERRED EMBODIMENT OF THE PRESENT INVENTION

Hereinafter, an embodiment of the lighting system according to the present invention is described with referring to the attached drawings. The present invention is applied to seal-imprint verification system in the embodiment.

Figure 2:
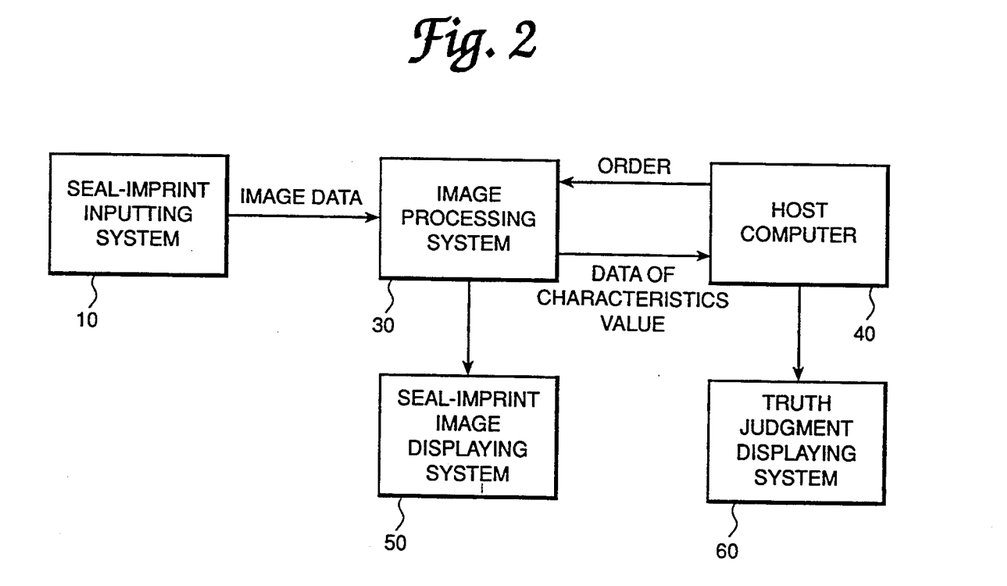
FIG. 2 shows a block diagram of outline structure of a seal-imprint verification system applied the present invention.

FIG. 2 shows the structure of outline of seal-imprint verification system. It comprises seal-imprint input system 10, image processing system 30, host computer 40, seal-imprint image display system 50 and truth judgment system 60.

Seal-imprint input system 10 photographs seal-imprint. The photographed image data is transmitted to image processing system 30. In image processing system 30, the characteristics value of seal-imprint is calculated (seal-imprint area, for example) by performing various image processing. Image processing system 30 works according to the order of host computer 40 and outputs the data of characteristics value of seal-imprint to host computer 40. Host computer 40 controls whole of the present system. Simultaneously, it evaluates the characteristic value from image processing system 30 and judges whether the seal-imprint agrees with the registered one or not. Seal-imprint display system 50 comprises CRT connected to image processing system 30 and displays a seal-imprint. Truth judgment system 60 comprises CRT connected to host computer 40 and displays the result of judgment if a seal-imprint agrees with the registered one or not.

Figure 3:
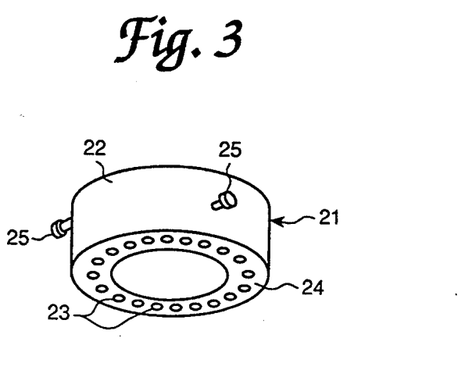
FIG. 3 shows a diagram of lighting structure from diagonal angle.
Figure 4:
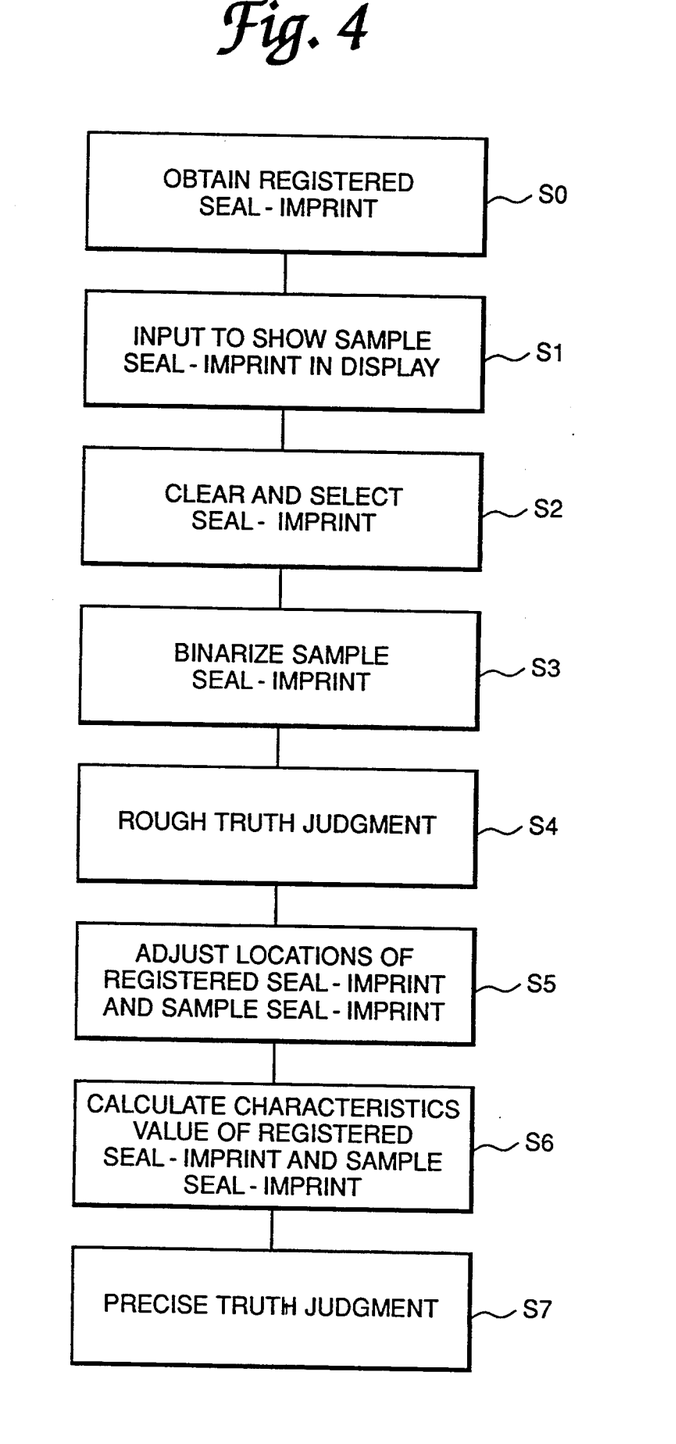
FIG. 4 shows a diagram of outline process for verification of seal-imprints.

Seal-imprint input system 10 comprises a CCD camera 11 as shown in FIG. 3 whose lens is received to mirror tube 12 which runs to downward from the main body. CCD camera 11 is confronted by paper 13 on which sealed imprint. CCD camera 11 can move parallelly to paper 13 and turn round in the center of the lens. On the outside of the lens, that is on lens-barrel 12, cylindrical irradiation mechanism 21 is settled, which comprises a lot of optical fibers 23 as shown in FIG. 4. Lens-barrel 12 and cylindrical irradiation mechanism 21 have a disk-shape, and cover cylindrical light shielding material 14. Cylindrical irradiation mechanism 21 has an annular shape. Optical fiber 23 is connected to light source (not indicated) which emits light by direct current such as halogen lamp.

Cylindrical light shield material 14 is settled between camera 11 and paper 13. Light shield material 14 is put on paper 13, whose upper edge is close to the body of camera 11 so as not to be irradiated by light from outside as little as possible. Inner circuit of light-shield material is covered by film 15 which reflects light such as aluminum foil.

FIG. 4 shows the structure of irradiation mechanism 21. Irradiation mechanism 21 comprises a lot of optical fibers 23 in circular support material 22: these optical fibers 23 are arranged circularly in the center of lens-barrel 12. Blue filter 24 transparent to light is put such as cellophane circular in the center of lens on the top part of each optical fiber 23, that is the bottom part of support material 22. The reason that filter 24 transparent to light is blue is that it is contrasty between seal-imprint and background paper because a seal-imprint to be photographed is vermilion. Support material 22 is fitted with lens-barrel 12 of camera 11 by screws 25.

In this way, the lighting system in the present invention comprises circular irradiation mechanism 21 surrounding the lens of camera 11 and light-shield material 14 controlling irradiation of light from outside. Irradiating mechanism 21 is constructed to obtain a clear seal-imprint by irradiating light to paper 13 evenly and irradiating blue light through blue cellophane (translucent filter) 24. It prevents entering light from outside by light shield material and is constructed to irradiate more evenly to seal-imprint by reflecting film 15. Therefore, it is possible to photograph an imprint sealed on paper 13 clearly and accurately as a whole: the precision of seal-imprint can be improved as a consequence.

Figure 5:
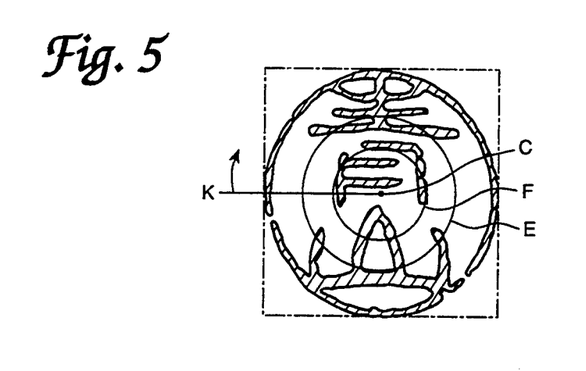
FIG. 5 shows an example of seal-imprint.

FIG. 5 shows the outline of the process of seal-imprint verification. The outline is explained first below.

In step S0, a registered imprint is obtained. It is obtained by photographing sealed imprint by CCD camera 11: the method is the same as in step S1, S2, S3 and S5 described later. In step S1, seal-imprint is inputted to display for comparing with the registered one. That is, photographing sealed imprint on paper by CCD camera 11, seal-imprint is displayed on CRT of seal-imprint display system 50. On step S2, seal-imprint is extracted by erasing background outside of seal-imprint and noise in sample one. On step S3, binarizing sample seal-imprint, a monochrome gray-level image is converted into black and white image.

In steps from S4 to S6, registered image and sample image is compared. In step 4, it is judged roughly if a sample seal-imprint is the same as registered one from the size and the number of pixels of the seal-imprint, or not. When the sample seal-imprint is judged to be different from the registered one, seal-imprint verification is concluded on the point of the judgment. When they are judged to be the same roughly, sample seal-imprint is placed upon registered one by rotation or parallel movement of sample one. Calculating characteristics value of registered and sample seal-imprint is step S6, the truth of the sample is judged in detail according to the characteristics value. Characteristics value here means the ratio of registered to sample seal-imprint, identification ratio, blur ratio and faint, patchy ratio. The area ratio, identification ratio, blue ratio, and faint, patchy ratio are defined later.

The processing in steps S0 to S7 is explained in detail here.

The processing in step S0 is described later because it is the same as in step S1, S2, S3 and S5 for sample seal-imprint to obtain exact registered seal-imprint with least blur or faint, patchy part. It is provided that registered seal-imprint is obtained already in i) to vii) below.

I) Processing in Step S1

Figure 1:
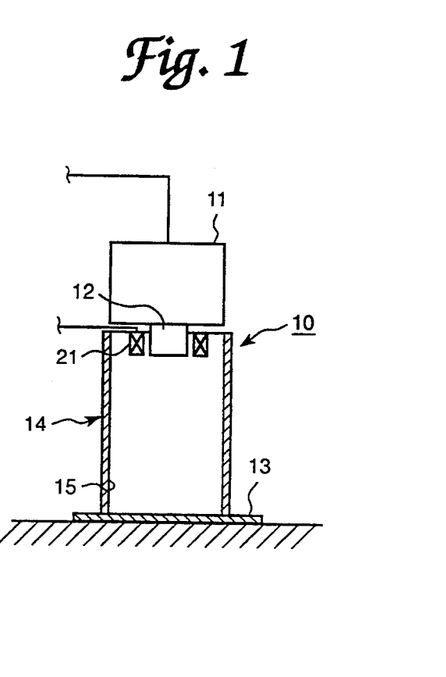
FIG. 1 shows a sectioned diagram of the first embodiment of the present invention.

Sample seal-imprint is photographed by CCD camera 11 with contrasty state between the sample and paper by irradiating blue light, as explained referring from FIG. 1 to FIG. 3. The seal-imprint obtained in this way is inputted to image processing system 30, executed A/D conversion, and displayed on CRT of seal-imprint display system 50. The monotonous color of black and white is displayed conversely so as seal-imprint to be white and background to be black in order to be easy to observe human eyes on CRT.

Since the ability to receive light of CCD changes according to time, tolerance may happen in the image of seal-imprint with only one photograph. Therefore, in the present embodiment, 32 times of photographing is executed for a seal-imprint in order to prevent the tolerance: at the same time, accumulating addition is performed on seal-imprint with 32 of brightnesses (densities) in each pixel in image processing system 30. A seal-imprint with gray-level is obtained by it.

II) Processing in Step S2

There may be included noises on paper (spots or so) which are not the real seal-imprint in the image obtained in step S1. In step S2, smoothing is performed by replacing the mean of brightnesses of each pixel in the area of $3 \times 3$ for example into the brightness of center pixel in the area and consequently, noises in an image become vague. After that, an edge of seal-imprint is sharpened by Sobel operator. Here, any method can be used for emphasizing an edge of an image except Sobel operator.

The image obtained in this way is binarized after deciding threshold by discrimination analysis method or other methods, and simultaneously, swelling is performed 5 times by one pixel for each time. In consequence, the characters in the seal-imprint is connected in one line even when blur, faint or patchy part are included, and noises also swell and become large. Then the seal-imprint is labeled at every connected diagram. The smaller number is added on the labeling. Therefore, it is presumed that the diagram with the largest number comprises at least seal-imprint, and that with smaller number than it is noise. Only the diagrams with the largest number are left and others are erased. Perpendicular and horizontal fillet diameters are calculated in the state and rough area of seal-imprint is decided according to the fillet diameters.

The parts outside of the area are all judged as background and erased recognizing all of brightness points (pixels) to be noises (that is, brightness is made to be "0").

III) Processing in Step S3

The area obtained in step S2 is placed upon the image of seal-imprint obtained in step S1. That is, the image of seal-imprint obtained in step S1 is surrounded by the area obtained in step S2: the brightness outside of the area is "0". Concerning to the density distribution in whole of the image of CRT displaying the seal-imprint image, the ratio of scattering within a class to that between classes (scattering ratio) is calculated and the threshold on which scattering ratio is maximum is calculated (discrimination analysis method). The image of seal-imprint is binarized using the threshold and converted into black and white colors. Other methods such as mode method can be adopted for threshold determination method.

IV) Processing in Step S4

Here, the area of sample seal-imprint and that of registered seal-imprint are compared and also both maximal diameters are compared. Area is compared by comparing the pixels of seal-imprint in each image. When there is a lot of difference between the area of sample seal-imprint and that of registered one, the sample is judged to) be different from registered one and seal-imprint verification is concluded without executing steps from S5 to S7. On the other hand, when there is (a) little difference between them, it is judged that sample seal-imprint is possible to be the same as registered one and step S5 and after it are executed.

With respect to maximal diameters, similar judgment is made. That is, when there is a lot of difference between the maximal diameter of sample seal-imprint and that of registered one, the sample is judged to be different from registered one and the seal-imprint verification is concluded without executing the steps after it. When there is (a) little difference between them, step 5 and thereafter are executed.

The value for judging if there is a lot of difference between the area or between the maximal diameters is decided by the statistical calculation below.

As for area, calculating (area of sample seal-imprint)/(area of registered seal-imprint)$\times 100$ for all samples, the mean value of all samples m and the standard deviation $\sigma$ are calculated. It is settled that the upper limit is $m+3\sigma$ and lower limit is $m-3\sigma$. The coefficient of $\sigma$ can be changed according to the necessity.

As for the maximal diameter, placing sample image upon registered image in CRT, how many pixels are spread outside of registered seal-imprint is calculated on all samples. Assuming that the maximal value among then is $\alpha$, the maximal diameter of registered seal-imprint is $\Phi$, and the maximal diameter of sample seal-imprint is $\phi$, $\phi$adopts ($\Phi+2\alpha$) as the standard value. When $\phi$ is larger than ($\phi+2\alpha$), the sample is judged to be different from registered one. The coefficient of $\alpha$ can be also changed according to the necessity.

V) Processing in Step S5

Figures 6A, 6B:
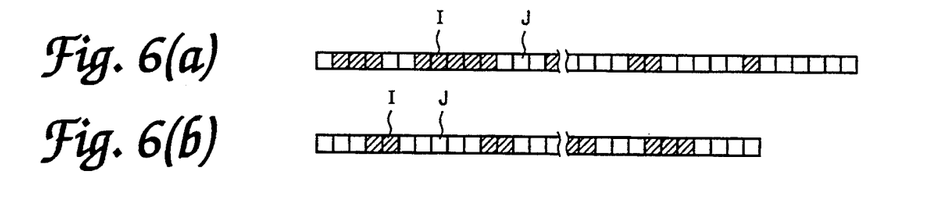
FIG. 6(a) shows pixels along the outside circle of registered seal-imprint.
FIG. 6(b) shows pixels along the inside circle of registered seal-imprint.

First, two of concentric circles E and F with arbitrary radius are drawn centered on the fillet center C as shown in FIG. 6. It is necessary that the radius of outer circle (with the units of pixel) is less than the value calculated below.

Figures 7A, 7B:
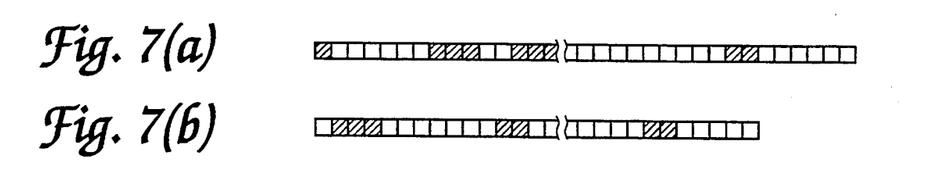
FIG. 7(a) shows pixels along the outside circle of sample seal-imprint.
FIG. 7(b) shows pixels along the inside circle of sample seal-imprint.

(maximal length of registered seal-imprint)/2–5 Assuming that the radius of the outside circle E has 50 pixels and the radius of inside circle F has 40 pixels from C of the center of fillet diameter. Next, extracting if pixels of registered seal-imprint on outside and inside circle, 1-dimensional spectrums as shown in FIGS. 7(a) and (b) are obtained. FIG. 7 (a) is an example of 1-dimensional spectrum of outside circle E and shows each pixel on the circle on scanning clockwise from standard line K. In the figure, hatched part I shows the existence of the pixel of registered seal-imprint and while part J shows the inexistence of the pixel of registered one. In the same way, FIG. 7(b) shows 1-dimensional spectrum of inside circle F.

Figures 8A, 8B, 8C:
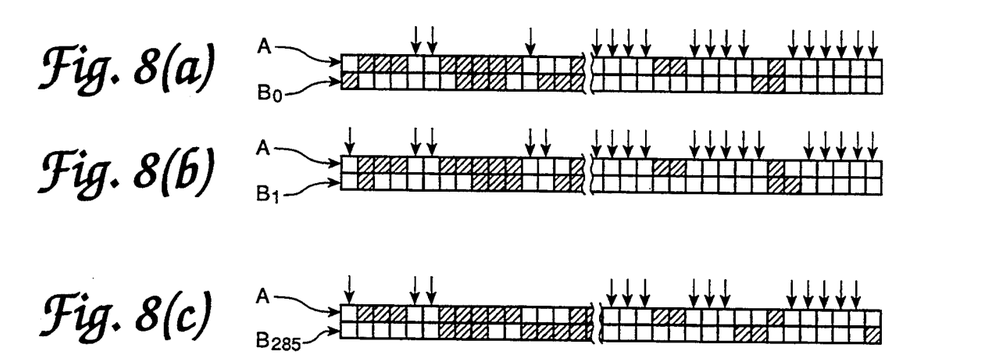
FIG. 8 is a diagram to overlap pixel data of sample seal-imprint by shifting 1 pixel on that of registered one.

As for sample seal-imprint, 1-dimensional spectrums of circles are obtained in the same way: that is, they are obtained after drawing circles with the radius of 50 pixels and 40 pixels as the center of fillet diameter of sample seal-imprint. FIG. 8 (a) shows an example of 1-dimensional spectrum of outside circle and FIG. 8(b) shows an example of 1-dimensional spectrum of inside circle.

In the next step, 1-dimensional spectrum A on the outside circle of registered seal-imprint and 1-dimensional spectrum B0 on the outside circle of sample seal-imprint are placed upon and compared each other by corresponding pixel as shown in FIG. 8. That is, as to spectrums A and B0, the out of parts in agreement are obtained by exclusive-or operation. In the figure, the out of the pixels in agreement are shown by arrows with regard to the relationship between spectrums A and B0. The disagreement ratio is calculated by dividing the number of pixels with arrows, that is the number of pixels out of agreement by the number of all the pixels in circle E of registered seal-imprint.

After that, spectrum B1 is obtained, which is shifted 1 pixel to the right from the spectrum of sample seal-imprint. The disagreement ratio between spectrum B1 and spectrum A of registered seal-imprint is calculated by the method described above. In the same way, disagreement ratio between A and the shifted by 1 pixel from the spectrum of sample seal-imprint is obtained sequentially. This operation is executed until shifted spectrum is Bn (n is the number of pixels of a circle).

When n of disagreement ratios are obtained, these disagreement ratios are compared each other and the minimal value is calculated in the next step. The number of shifted pixels at the point of minimal value is converted into rotation angle by the following formula.

Rotation Angle=(Number of Shifted Pixels)$\times 360°$/n

The angle for the sample seal-imprint to be rotated is obtained for the comparison with registered seal-imprint. That is the value calculated by the formula is the rotation angle with the outside circle E as the standard.

Executing the same operation with respect to the inside circle F, the angle to be rotated for the sample seal-imprint is calculated with the inside circle F as the standard.

When some differences occur between the rotation angle obtained from the outside circle and that obtained from the inside circle, the rotation angle with low disagreement ratio is adopted and sample seal-imprint is rotated and displaced as the rotation angle. The rotation angle then is presumed to be $\theta 1$.

After the rotation, the sample seal-imprint is moved parallelly in order for identification ratio between the sample and registered seal-imprint to be the maximum. The parallel movement is explained here referring FIG. 9(a), (b), and FIG. 10.

Figure 9A:
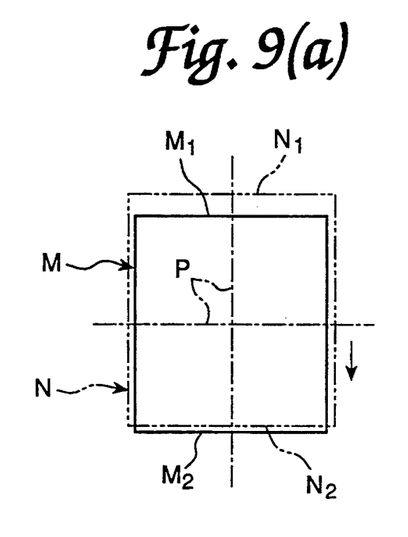
FIG. 9(a) shows parallel movement of sample seal-imprint in up and down direction on registered seal-imprint.
Figure 9B:
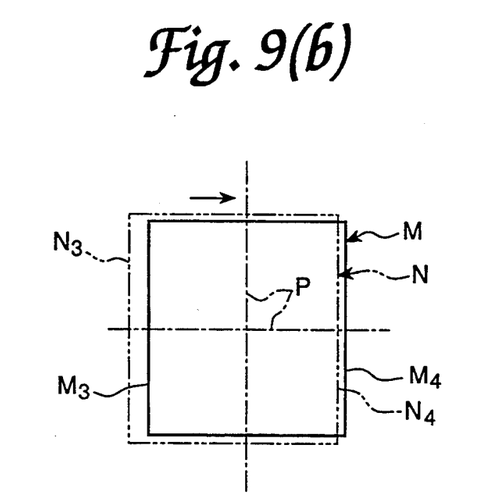
FIG. 9(b) shows parallel movement of sample seal-imprint in right and left direction on registered seal-imprint.

In FIGS. 9(a) and (b), solid line M shows fillet diameters (horizontal and vertical outlines) of registered seal-imprint. Chain line with one dot P and chain line with two dots N show horizontal and vertical center lines of registered seal-imprint, a fillet diameter of sample seal-imprint, respectively.

As shown in FIG. 9(a), sample seal imprint is placed by taking the position for the center of the upper horizontal fillet diameter of sample seal imprint to be 5 pixels above the upper horizontal fillet diameter of registered seal-imprint. The identical number of pixels between sample seal-imprint and registered one is counted. Displacing sample seal-imprint on the position 3 pixels below the registered one, the identical number of pixels is counted. In the same way, moving sample seal-imprint to the position 3 pixels below, the identical number of pixels is counted; and the present processing is repeated until the center of horizontal fillet diameter N2 on lower side of sample seal-imprint comes 5 pixels below the center of horizontal fillet diameter M2 on lower side of registered seal-imprint.

Next, as shown in FIG. 9(b), the identical number of pixels between sample seal-imprint and registered one is counted by placing sample seal-imprint on the location that the center of vertical fillet diameter N3 on left side of sample seal-imprint is 5 pixels left from the center of vertical fillet diameter M3 on left side of registered seal-imprint. The identical number of pixels is calculated again by displacing rightward by 3 pixels from the registered seal-imprint. Similarly, displacing sample seal-imprint rightward by 3 pixels, the identical number of pixels is counted until the center of vertical fillet diameter N4 on the right side of sample seal-imprint comes a position rightward by 5 pixels from the center of vertical fillet diameter M4 on the right side of registered seal-imprint. The location "a" of sample seal-imprint with the maximal identification ratio is obtained among them moved parallelly upper, below, left and right.

Figure 10:
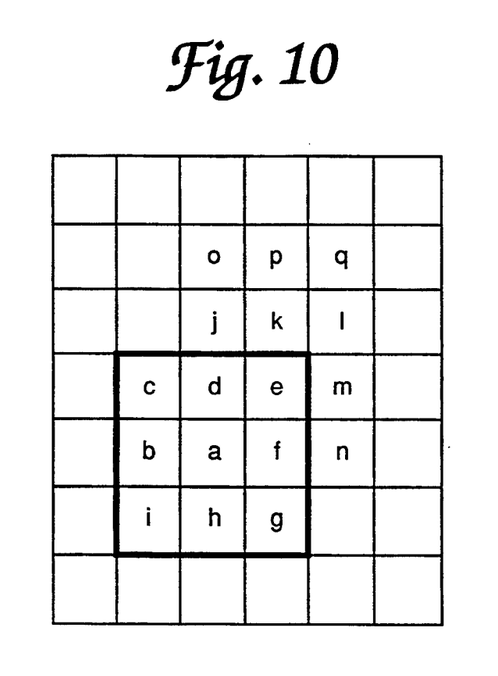
FIG. 10 shows 3×3 area for searching the location with the maximum identification ratio between sample seal-imprint and registered one.

After that, as shown in FIG. 10, sample seal-imprint is moved with respect to 8 pixels in area Q which is the neighborhood of 1 pixel around in the center of "a" with the most highest identification ratio, and the identification ratio between the pixels in sample seal-imprint and the registered one on each place.

That is, moving whole of sample seal-imprint from the location of "a" to "b" of 1 pixel left, the identification ratio between the sample and the registered one is calculated. In the next, moving it from "b" to "c" whose location is 1 pixel upper of "b", the identification ratio between it and seal-imprint is calculated. In the same way, moving a sample seal-imprint to locations "d", "e", "f", "g", "h" and "i" in sequence, identification cation ratio on each location is calculated. When the identification ratio on location "a" is the largest among all of identification ratios on location "b" to "i" the parallel movement is concluded.

When there is a location with identification ratio lager than that on location "a" from location "b" to "i" sample seal-imprint is moved on the location with the largest identification ratio. If "e" is such a place, sample seal-imprint is moved from "j" on 1 pixel neighborhood to "k", "l", "m" and "n" as the center to be "e"; and identification ratio on each location is calculated. When the identification ratio on "e" is larger than any value from that on "j" to "n" parallel movement of sample seal-imprint is concluded on "e".

If "k" has the identification ratio larger than that on "e", sample seal-imprint is moved from "0" on 1 pixel neighborhood of "k" to "p" and "q" sequentially; simultaneously, identification ratio on each location is calculated. When the identification ratio on "k" is the most largest among those on "o" to "q", parallel movement is concluded on "k".

When there is some locations with the identification ratio larger than that on "k" the location with the largest one becomes the new center point and the identification ratio on the location of 1 pixel neighborhood is calculated.

Continuing the operations above, the location with the largest identification ratio between the registered and a sample seal-imprint, which concludes moving parallelly. The movement quantity of right or left is provided to be X1, and upper or lower, to be Y1.

After concluding rotation or parallel movement, the movements are repeated again and fine adjustment for positioning is executed. On the fine adjustment, the centers of circles E and F are the center of fillet diagram of registered seal-imprint as to a sample seal-imprint. Therefore, as to the rotation of sample seal-imprint, the identification ratio between it and registered one is calculated by rotating it on the axis of the center of fillet diagram of the registered one. Parallel displacement is calculated from the center. The rotating angle, movement distance in rightward or leftward, and movement distance in upper or lower direction are assumed to be $\theta 2$, X2 and Y2.

In the present embodiment, 2 kinds of angles and a parallel movement distance are calculated by executing rotation and parallel movement twice respectively. 2 of rotation angles $\theta 1$ and $\theta 2$ are added to the angles above and the value after the addition is the rotation angle to give to sample seal-imprint finally. Similarly, rightward or leftward parallel movement quantity X1 and X2 are added together, and also, upward or downward parallel movement quantity Y1 and Y2 are added together: these values after the addition are the parallel movement quantities of sample seal-imprint in the right or left direction and upper or lower direction.

The binarized sample seal,imprint obtained in step S3 is placed on registered one by rotating or moving parallelly as the quantity after addition in below.

$(\theta 1+\theta 2)$, $(X1+X2)$, $(Y1+Y2)$

The processing of rotation and parallel movement of sample seal-imprint is completed by once. Consequently, it prevents the generation of error from quantization in minimum by it.

It is possible to place a sample seal-imprint on registered one through the process that
i) rotating CCD camera by an angle of $(\theta 1+\theta 2)$ parallelly displacing by a distance of $(X1+X2)$ and $(Y1+Y2)$,
ii) obtaining new binarized sample by performing from step S1 to step S3. Errors from quantization are not generated in this case.

It is also possible to place a sample seal-imprint on registered one through the process below.
i) Rotating CCD camera once as the quantity of 1 parallelly displacing by a distance of X1 and Y1, on the step that 1, X1 and Y1 are obtained;
ii) Obtaining binarized sample seal-imprint by performing from step S1 to S3;
iii) Calculating $\theta 2$ of rotation, X2 and Y2 of parallel movement from the sample obtained in ii);
iv) Obtaining new binarized sample seal-imprint by performing steps from S1 to S3 after moving CCD camera as $\theta 2$, X2 and Y2. Quantization error is not generated in this case, too.

On the stage that a sample seal-imprint is placed on registered one, fillet diameter to surround the seal-imprint placed on another is drawn. The fillet diagram is divided equally in three from the top to the bottom and also divided equally in three from the right to the left, that is, divided equally in nine. Both seal-imprints are divided in the nine rectangle. The area ratio between divided part of registered seal-imprint and sample seal-imprint is calculated in every part of rectangle. When the nine area ratios calculated in this way are within the area ratio used in step 4, the processing goes forward to step S6: when at least one in 9 area ratios is out of the range of area ratios used in step S4, the processing is concluded then. It shows that the processing is performed to check the condition of losses, and the verification is not performed for what with too many losses. Of course, the number of division and the threshold of area ratio in each small part can be changed according to the necessity.

VI) Processing in Step S6

In step S6, characteristics values of registered seal-imprint and sample one. The characteristics values mean area ratio to check the characteristics in general situation of a seal-imprint, identification ratio (master), identification ratio (itself), blur ratio (master), blur ratio (itself), faint and patchy ratio (master), faint and patchy ratio (itself), and the coefficient of faint and patchy ratio on swelling to check in detail the difference of stroke in a character included in a seal-imprint. These are defined as below.

The number of pixels with agreement is "the total number of overlapped pixels when a sample seal-imprint is placed on the registered one"; the number of pixels with blur is "the total number of pixels in sample seal-imprint when a sample sealimprint is placed on the registered one"; the number of faint and patchy pixels is "the total number of pixels without overlapping when a sample seal-imprint is placed on the registered one". The number of sample seal-imprint and that of the registered one are assumed to be S and T, respectively.

In the following formulae, the values are in "%". "Master" and "itself" in parentheses show "the ratio of the number of pixels with agreement to the number of pixels of registered seal-imprint" and "the ratio of the number of pixels with agreement to the number of pixels of sample seal-imprint", respectively.

Area Ratio = $(S/T) \times 100$
Identification Ratio (master) =
    (number of pixels with agreement/$T$) $\times$ 100
Identification Ratio (itself) =
    (number of pixels with agreement/$S$) $\times$ 100
Blur Ratio (master) = (number of blur pixels/$T$) $\times$ 100
Blur Ratio (itself) = (number of blur pixels/$S$) $\times$ 100
Faintness and Scratchiness Ratio (master) =
    (number of pixels with faintness and scratchiness/$T$) $\times$ 100
Faintness and Scratchiness Ratio (itself) =
    (number of pixels with faintness and scratchiness/$S$) $\times$ 100

The coefficient of swelling, faintness and scratchiness is calculated by the next formula after swelling registered seal-imprint as 1 pixel 8 times and calculating the number of blur pixels included each swelling layer in the state of overlapping the registered seal-imprint and sample 80.

Figure 11:
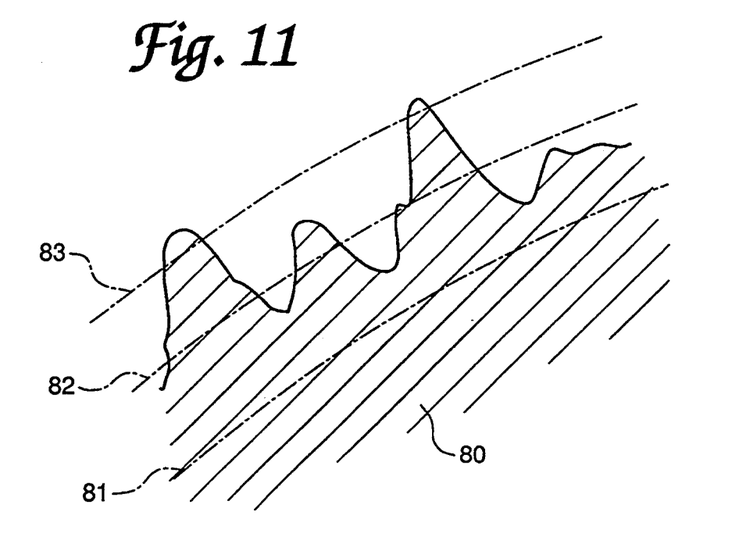
FIG. 11 shows a sample seal-imprint and registered one to be swelled.

Coefficient of Swelling and Blur in n-th Layer=- (number of pixels with agreement+number of blur pixels from swelled first layer to swelled n-th layer)/(number of pixels in sample seal-imprint)$\times$100 n is from 1 to 8. Swelled and blur coefficient is calculated in each swelled layer from the first to the eighth. (cf. FIG. 11)

VII) Processing in Step S7

When sample seal-imprint is corresponding to the registered one, the states of blur or faintness and scratchiness of the two will be similar in the case that it is similar the way of sealing, that is the quantity of ink and the pressure to seal are almost the same. Therefore, a certain relationship can be found out by gathering seal-imprints with the similar way of sealing and performing statistical processing to each characteristics quantity above.

To execute it, the following steps are carried out.

i) Characteristics values mentioned in step S6 are calculated by performing steps from S1 to S6 concerning to every sample seal-imprint in enormous number of sample seal-imprint;

ii) Performing clustering (classification in types) to the characteristics value obtained in i) by cluster analysis in 3 directions of
Identification Ratio (master and itself)
Area Ratio
Blur Ratio (master and itself) and Faint,
 Scratchy Ratio (master and itself), the mean distribution of characteristics values in each cluster, that is the standard data, is obtained.

According to the standard data, it is possible to know that the following data are to be what percent around when the area ratio is 80% considering the clustering: identification ratios (master and itself), blur ratios (master and itself), faint and scratchy ratio (master and itself), characteristics values on swelling blur ratio coefficients from 1 to 8. A sample seal imprint is judged to be corresponding to the registered one when the characteristics value is within the certain range: it is not judged to be corresponding to the registered one when the characteristics value is out of the range.

The present embodiment, the judgment of characteristics values is constructed from 3 units, that is, unit 1 which clusters with the data of the identification ratios of master and itself, unit 2 which clusters with the data of the area ratio calculated by dividing a sample seal-imprint by the registered one and unit 3 which clusters with the data of blur ratios of master and itself and faint, scratchy ratios of master and itself.

In unit 1, clustering the characteristics values from the data of identification ratios of master and itself, the following data of the rest characteristics value is examined. That is, area ratio, blur ratios of master and itself, faint and scratchy ratios of master and itself, and each swelling blur coefficient from the first layer to the eighth layer.

In unit 2, clustering the characteristics values from the data of area ratio, the following data of the rest is examined. That is, identification ratios of master and itself, blur ratios of master and itself, faint and scratchy ratios of master and itself, and each swelling blur coefficient from the first to the eighth layer. In unit 3, clustering the characteristics values from the data of blur ratios of master and itself, faint and scratchy ratios of master and itself, and area ratio, the following data of the rest is examined. That is, area ratio, identification ratios of master and itself, and each swelling blur coefficient from the first to the eighth layer.

Figure 12:
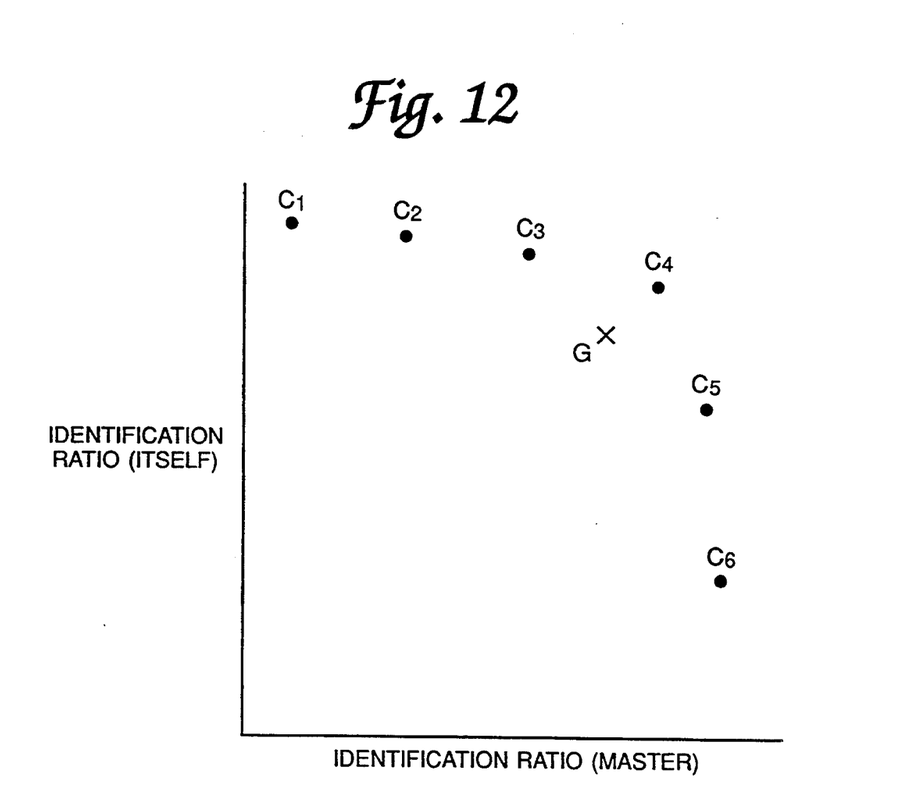
FIG. 12 shows clustering on standard data in identification ratio of sample seal-imprint corresponding to registered one.

First, in unit 1, it is examined that the sample seal-imprint in verification belongs to which cluster from the relationship of identification ratios of master and itself. FIG. 12 shows the standard data generally and approximately. In FIG. 12, it is shown that there is a certain relationship between identifications of master and itself, and there are 6 clusters from C1 to C6. Assuming that point G shows the relationship between both of identification ratios of the sample seal-imprint in verification, it is examined which mean value in clusters (shown with black point) is the closest to point G. It can be obtained by calculating the minimum square distance (the minimum value of Euclid distance). As to the example in FIG. 12, the relationship between the sample seal-imprint and the registered one in verification now is C4 in the fourth cluster, according to the examination above.

In the cluster to which the relationship is classified (here, the fourth cluster C4), it is judged if area ratio, blur ratios (master and itself), faint and scratchy ratios (master and itself) are judged if they are within the standard data or not. Here, in the standard data in cluster C4, mean value and standard deviation are assumed to be those in TABLE 1 below.

TABLE 1

|  | Mean Value | Standard Deviation |
| --- | --- | --- |
| Area Ratio | 118.6 | 5.0 |
| Blur Ratio (Master) | 21.8 | 3.1 |
| Blur Ratio (Itself) | 18.3 | 2.4 |
| Faint and Scratchy Ratio (Master) | 2.7 | 2.2 |
| Faint and Scratchy Ratio (Itself) | 2.2 | 1.8 |

In the present embodiment, blur ratios and faint and scratchy ratios in sample seal-imprint and registered one in verification are judged if they are within the range that 3 times of standard deviation with the mean value in the center or not (that is, it is judged if they are within the range of (mean value)$+-3\times$(standard deviation)). For example, when area ratio in 122.6, blur ratio (master) is 22.6, blur ratio (itself), faint and scratchy ratio (master) is 4.3, and faint and scratchy ratio (itself) is 3.9, they are all in the range above and the sample seal-imprint is supposed to be corresponding to registered seal-imprint. When at least one of them is out of the range, however, the sample seal-imprint in verification is not judged to be corresponding to the registered one.

After the judgment above, swelling blur coefficient is examined. For example as to the n-th layer in FIG. 11, assuming line 83 is adopted, the swelling blur coefficient is calculated, as shown in step S6, by adding the total number of pixels in layer 81 to 83 to the number of pixels of identification, and dividing the result by all the number of pixels in sample seal-imprint, then multiplying the result by 100. The coefficient calculates the standard deviation which shows the mean value and the distribution in every cluster and in every layer from the first to the eighth. For example, swelling blur coefficient in cluster C4 are calculated as in TABLE 2.

TABLE 2

|  | Swelling Blur Coefficient | |
| --- | --- | --- |
|  | Mean Value | Standard Deviation |
| 1st Layer | 93.0% | 3.6 |
| 2nd Layer | 98.8% | 1.2 |
| 3rd Layer | 99.8% | 0.4 |
| 4th Layer | 99.9% | 0.2 |
| 5th Layer | 100.0% | 0.1 |
| 6th Layer | 100.0% | 0.05 |
| 7th Layer | 100.0% | 0.02 |
| 8th Layer | 100.0% | 0.01 |

In the present embodiment, faint and scratchy coefficient in each layer in sample seal-imprint is examined if it is within the range of standard value shown in TABLE 2 or not; that is, the range of standard value to be examined is (mean value of swelling blur coefficient)$+-3\times$(standard deviation). When all swelling blur coefficient of sample seal-imprint are within the range of standard value, the sample seal-imprint is judged to be corresponding to the registered one. On the other hand, if at least one of swelling blur coefficients of 8 is out of the range, it is judged to exist the possibility of no correspondence between the sample seal-imprint and registered one.

The judgment in unit 1 is completed.

The judgment in unit 2 is executed for next clustering, from area ratio in the same way as in unit 1. Characteristic values are executed if they are within the standard values: that is, identification ratios (master and itself), blur ratios (master and itself), faint and scratchy ratios (master and itself), swelling blur coefficients from the first to the eighth layer. When all of identification ratios (master and itself), blur ratios (master and itself), and faint and scratchy ratios (master and itself) are within the standard value, the sample seal-imprint is judged to be the same as the registered one. When at least one of them is out of the standards value, the sample seal-imprint is judged to be different from the registered one. On the next step, swelling blur coefficient is examined. The examination is similar to that in unit 1. When 8 of swelling blur coefficients are within the standard value, the sample seal-imprint is judged to be the same as the registered one. When at least one of them is out of the range of standard value, the sample seal-imprint is judged to have the possibility of no sameness as the registered one.

Finally, the judgment is executed in unit 3. The way is the same as in units 1 and 2. Clustering is carried out in 4 items of blur ratios of master and itself, and faint and scratchy ratios of master and itself. The rest of characteristics values of sample seal-imprint are examined when they are within the standard value or not: that is, area ratio, identification ratios of master and itself, and each swelling blur coefficient from the first to the eighth layer are. The judgment is the same as in units 1 and 2, whether sample seal-imprint corresponds to the registered one or not, and whether there is a possibility that the sample seal-imprint is quite different from the registered one.

Here, from units 1 to 3, the judgment is completed from the general view, that is, area ratio, identification ratios of master and itself, blur ratios of master and itself, faint and scratchy ratios of master and itself, and swelling blur coefficient from the first to the eighth layers for detailed standard judgment of a difference of character to construct the seal-imprint. Final judgment is executed as follows.

1. A sample seal-imprint is judged to be the same as the registered one when all general view of judgments from units 1 to 3 are accepted (that is, the characteristics value of sample seal-imprint are within the standard value), and all the detailed standard of judgment for differences of strokes are accepted.
2. A sample seal-imprint is judged to be the different one from the registered seal-imprint, even in the case that all of detailed standards of judgment are accepted, when at least one of general view of judgments from unit 1 to 3 is not accepted (that is, (a) characteristics value(s) is/are out of the range of standard value).
3. A sample seal-imprint is judged to have the possibility of different seal-imprint from the registered one when at least one of detailed standards of judgment is not accepted even if all of standard of judgment from unit 1 to 3 are accepted.

Here, precise truth judgment is completed in step S7.

The number of clusters used in the judgment is selected according to the judgment precision. It is described referring to FIGS. 13 and 14.

Figure 13:
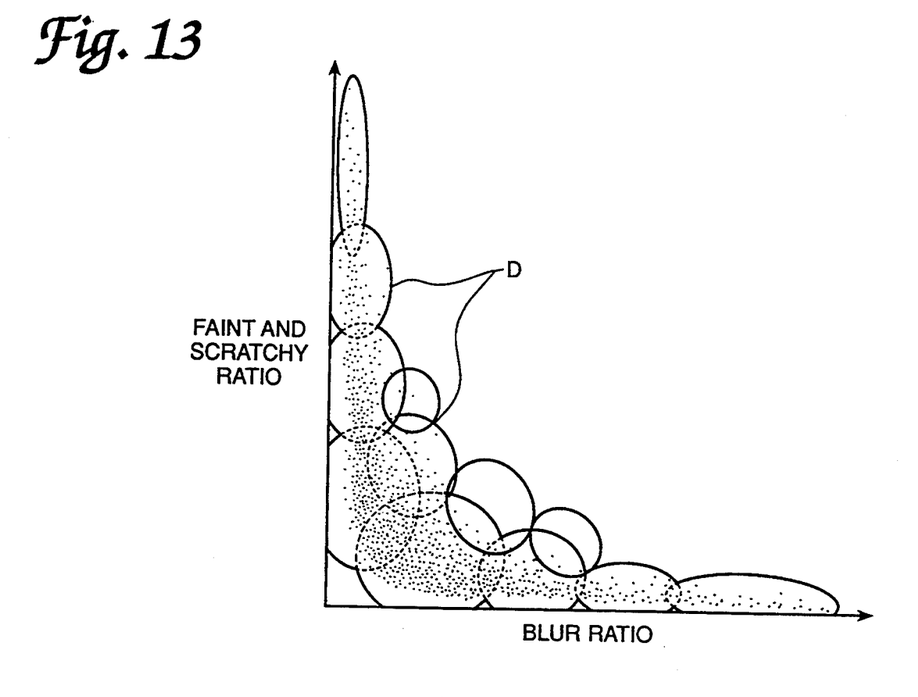
FIG. 13 shows the relationship between blur ratio and faint, scratchy ratio in the case that the number of clusters is 12.
Figure 14:
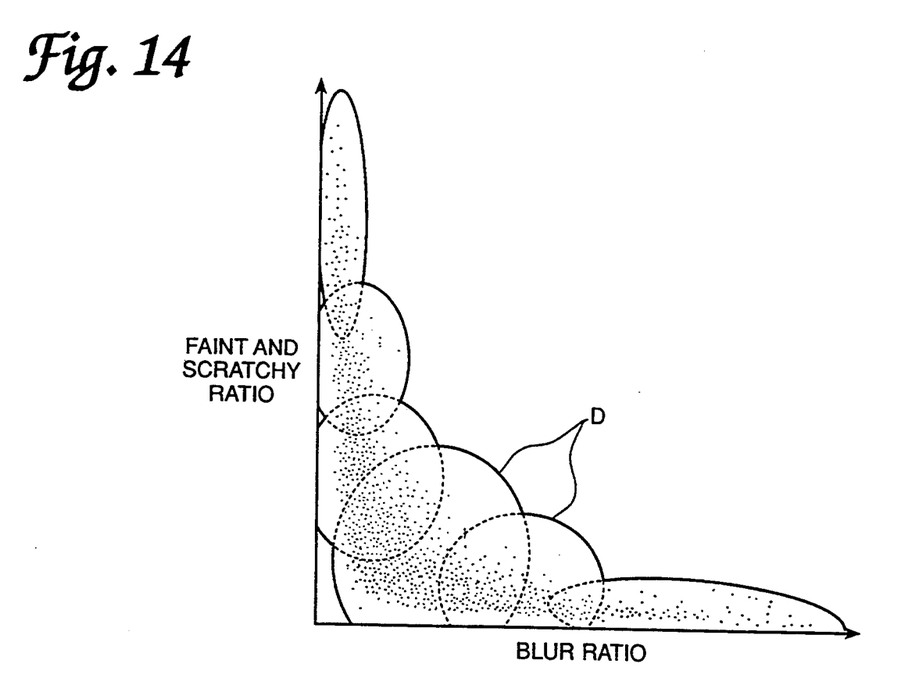
FIG. 14 shows the relationship between blur ratio and faint, scratchy ratio in the case that the number of clusters is 6.

These diagrams show the relationship between blur ratio of master and faint, scratchy ratio of master in the case that a sample seal-imprint corresponds to the registered one. Each point shows the data of blur ratio and faint, scratchy ratio, and ellipse D shows clusters. The abscissa of the center point in each cluster is the mean value of blur ratio of data in the cluster, and the ordinate is the mean value of faint, scratchy ratio of data in the cluster. The size of ellipse is decided by taking major diameter or minor diameter with the length of 3 times of standard deviation $\sigma$ in plus and minus directions in the middle of the mean value of blur ratio, and by taking major diameter or minor diameter with the length of 3 times of standard deviation $\sigma$ in plus and minus directions in the middle of the mean value of faint and scratchy ratio.

As understood from FIGS. 13 and 14, the less the blur ratio becomes, the more the faint and scratchy ratio are, when sample seal-imprint is the same as the registered one. Comparing FIG. 13 with 12 of clusters and FIG. 14 with 6 of clusters, it is clear that the more the number of clusters increases, the smaller the area of a cluster becomes and as the result the narrower the area becomes to be surrounded by all the clusters. That is, the more the number of clusters is, the shorter the length of major diameter and minor diameter in ellipse of cluster are. Therefore, the more the number of clusters is, the more difficult the verification of seal-imprints becomes: the fewer the number of clusters is, the easier the verification of them because conditions for verification becomes looser.

VIII) Processing in Step S0

It is described below the method for obtaining registered seal-imprint before the judgment above. It is the same as those in steps S1, S2, S3 and S5 basically.

First, 4 (for example) clear seal-imprints are selected among sealed imprints. The first seal-imprint is photographed by CCD camera by the same way in step S1. That is, photographing it 32 times, gray-level image is obtained, which is performed accumulating addition on 32 of seal-imprints. An area is approximately decided by clearing image in the same way in step S2. Overlapping this area on the image obtained in step S1, the image outside of the area is deleted and the image inside of the area is binarized in the same way in step S3. Consequently, gray-level image and binarized image of the first seal-imprint are obtained.

Next, binarized image of the second seal-imprint is obtained by executing steps S1, S2 and S3 in the same way as to the first one. This is the second processed imprint. The second binarized imprint is overlapped on the first binarized imprint and their locations are adjusted by moving rotationally or parallelly as in step S5. The gray-level image of the second seal-imprint is moved with the angle and length obtained here on the gray-level image of the first seal-imprint.

In all the sere way of the second seal-imprint above, the gray-level images of the third and the fourth seal-imprint are overlapped on the gray-level of the first seal-imprint sequentially.

Here, the locations of the gray-level images from the first to the fourth seal-imprints are adjusted each other: the one obtained in such a way is the gray-level image of the registered seal-imprint. The binarized image of the registered seal-imprint is obtained by performing from step S2 to step S3. The present binarized one is the standard to verify sample seal-imprints.

In this embodiment, the number of overlapped seal-imprints is 4: any number will do in practical use.

The numeral in the description of above embodiment is the example.

As mentioned above, it is possible to irradiate light in even on whole of an image by the present invention. Consequently, it is possible to obtain a lighting system for more precise image.

What is claimed is:

1. A lighting system for a camera including light irradiation means, said light irradiation means comprising:
   more than two separate luminous objects arranged circularly concentric to and substantially coplanar with a lens of said camera;
   a cylindrical shield part to restrain light from outside of said cylindrical shield part, arranged between said camera and an object to be photographed; and
   a color filter which is transparent substantially only to light of a complementary color of a color of said object, between said light irradiation means and said object to be photographed.

2. A lighting system as in claim 1, further comprising means for reflecting light on an inner surface of said cylindrical shield part.

3. An input system for obtaining an optical image of data on a surface under observation, comprising:
   a cylindrical light shielding means having a first end adapted to be placed on said surface under observation, and a second end opposite said first end; and
   a disk-shaped cover, covering said second end, comprising:
      an image receiving means, in a central portion of a surface of said disk-shaped cover, and which faces an inside of said cylindrical light shielding means, for receiving an optical image of said data,
      an irradiation mechanism, of a circular shape and surrounding said image receiving means, said irradiation mechanism producing light within said cylindrical light shielding means, and
      a color filter which is transparent substantially only to light of a complementary color of a color of said surface under observation, between said irradiation means and said surface under observation.

4. An input system as in claim 3, wherein said cylindrical light shielding means has a reflective inner surface.

5. An input system as in claim 3, wherein said irradiation mechanism comprises a plurality of optical fibers, one end of each of said plurality of optical fibers receiving light from a light source, and an other end of each of said plurality of optical fibers being arranged in a circular shape around said image receiving means in said disk-shaped cover.

6. A lighting system for a camera comprising:
   an annular casing surrounding a camera lens of said camera;
   a plurality of optical fibers each of which is connected with a light source at a first end and fixed to said annular casing at a second end, so that light is transmitted from said light source to said second end and is emitted from said second end toward an object to which said camera lens is facing;

a cylindrical light-shield one end of which surrounds said annular casing in close proximity to said annular casing so as to shield light from outside of said cylindrical light-shield, and an other end of which touches said object so as to shield light from outside of said cylindrical light-shield; and a color filter with a complementary color of a color of said object, said color filter attached to said lens so that an image of said object is filtered.

7. An input system for obtaining an optical image of data of a circular shape on a surface, comprising:

a cylindrical light shielding means having a first end adapted to be placed on said surface, and a second end opposite said first end; and a disk-shaped cover, covering said second end of said cylindrical light shielding means comprising an image receiving means, in a central portion of a surface of said disk-shaped cover, and which faces an inside of said cylindrical light shielding means, for receiving an optical image of data of said circular shape; and an irradiation mechanism, of a circular shape and surrounding said image receiving means, said irradiation mechanism producing light; wherein said surface is paper, and said irradiation mechanism further comprises a filter transparent to blue light to maximize a contrast between said optical image of data and said paper.

8. An input system as in claim 7 wherein said cylindrical light shielding means has a reflective inner surface.

9. An input system as in claim 7 wherein said irradiation mechanism comprises a plurality of optical fibers, one end of each fiber receiving light from a light source, and an other end of each fiber arranged in a circular shape around said image receiving means in said disk-shaped cover.

10. A lighting system for a camera, comprising:

an annular casing surrounding a camera lens of said camera;

a plurality of optical fibers each of which is connected with a light source at a first end and fixed to said annular casing at a second end, so that light is transmitted from said light source to said second end and is emitted from said second end toward an object to which said camera lens is facing;

a cylindrical light-shield one end of which surrounds said annular casing in close proximity to said annular casing so as to shield light from outside of said cylindrical light-shield, and an other end of which touches said object so as to shield light from outside of said cylindrical light-shield; and a color filter, disposed between said plurality of optical fibers and said object and transparent to only light of a complementary color of a color of said object, said color filter filtering light emitted from said second end of each of said plurality of optical fibers so that said object is irradiated with light of said complementary color.

* * * * *